(12) United States Patent
Ryan et al.

(10) Patent No.: US 6,980,560 B2
(45) Date of Patent: Dec. 27, 2005

(54) SYSTEM AND METHOD FOR CONNECTING COMMUNICATION DEVICES OVER PACKET NETWORKS

(75) Inventors: Pat D. Ryan, Yorba Linda, CA (US); Michael S. Beadle, Tustin, CA (US); Skantha Kandiah, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 796 days.

(21) Appl. No.: 09/965,745

(22) Filed: Sep. 28, 2001

(65) Prior Publication Data

US 2002/0176401 A1   Nov. 28, 2002

Related U.S. Application Data

(60) Provisional application No. 60/293,911, filed on May 25, 2001.

(51) Int. Cl.$^7$ .............................................. H04J 3/22
(52) U.S. Cl. .................................... 370/401; 370/465
(58) Field of Search ............................. 370/401, 465, 370/466, 351, 352, 286, 347, 344, 480, 442, 370/389; 379/43.04, 43.11, 100.13

(56) References Cited

U.S. PATENT DOCUMENTS

| | | | |
|---|---|---|---|
| 5,546,388 A | | 8/1996 | Lin |
| 5,790,641 A | | 8/1998 | Lam et al. |
| 5,903,547 A | | 5/1999 | Shimokasa |
| 5,953,346 A | * | 9/1999 | Luddy ........................ 370/465 |
| 6,292,553 B1 | | 9/2001 | Fellingham et al. |
| 6,453,034 B1 | | 9/2002 | Donovan et al. |
| 6,477,164 B1 | * | 11/2002 | Vargo et al. ................ 370/356 |
| 6,480,585 B1 | * | 11/2002 | Johnston ................ 379/100.17 |
| 6,504,838 B1 | | 1/2003 | Kwan |
| 6,757,367 B1 | | 6/2004 | Nicol |
| 6,829,244 B1 | | 12/2004 | Wildfeuer et al. |

OTHER PUBLICATIONS

MR. Dave Cassing, Director of Engineering RadiSys Corp., Telecommunication Div., "C6x Solutions for Voice Over IP Gatewa", pp. 74-85, 1998.*

"Procedures for real time Group 3 facsimile communication over ip-networks" ITU-T Recommendation T. 38, XX, XX, Jun. 1998, pp. 1-30, XP002163782.

* cited by examiner

*Primary Examiner*—Dang Ton
(74) *Attorney, Agent, or Firm*—Farjami & Farjami LLP (57) ABSTRACT

There is provided system and method for communication over a network, which includes a first gateway and a second gateway capable of communicating with each other using a packet protocol. Further, the second gateway is capable of communicating with a communication device, such as a modem device or a facsimile device, over a telephone line. The second gateway receives a call request from the first gateway for the communication device. In response to such call request, the second gateway places a call to the communication device over the telephone line. Next, a tone detector is enabled to detect a tone, such as an answer tone generated by the modem or facsimile device. Second gateway detects the answer tone received from the communication device over the telephone line and enables a filter, in response to the detection of the answer tone, to prevent the answer tone from reaching the first gateway.

44 Claims, 5 Drawing Sheets

SYSTEM AND METHOD FOR CONNECTING COMMUNICATION DEVICES OVER PACKET NETWORKS

RELATED APPLICATIONS

The present application claims the benefit of U.S. provisional application Ser. No. 60/293,911, filed May 25, 2001, which is hereby fully incorporated by reference in the present application.

BACKGROUND OF THE INVENTION

1. Field of the Invention

The present invention generally relates to communications over packet networks, such as Internet Protocol ("IP") and, more particularly, to connecting communication devices over IP, such as connecting modem or facsimile devices over IP.

2. Related Art

Today the traditional analog telephony is being rapidly replaced with digital IP. telephony, which use various techniques to break voice into data packets for transmission over packet networks. Analog modems have been utilized to provide data, facsimile and voice communications over twisted pair telephone lines for decades. Modem is an analog-to-digital and digital-to-analog converter, which is capable of adapting a terminal or computer to an analog telephone line by converting digital pulses to audio frequencies and vice versa. Because a significant infrastructure is in place using such modems, the packet networks need to address and support modem communication.

Figure 1:
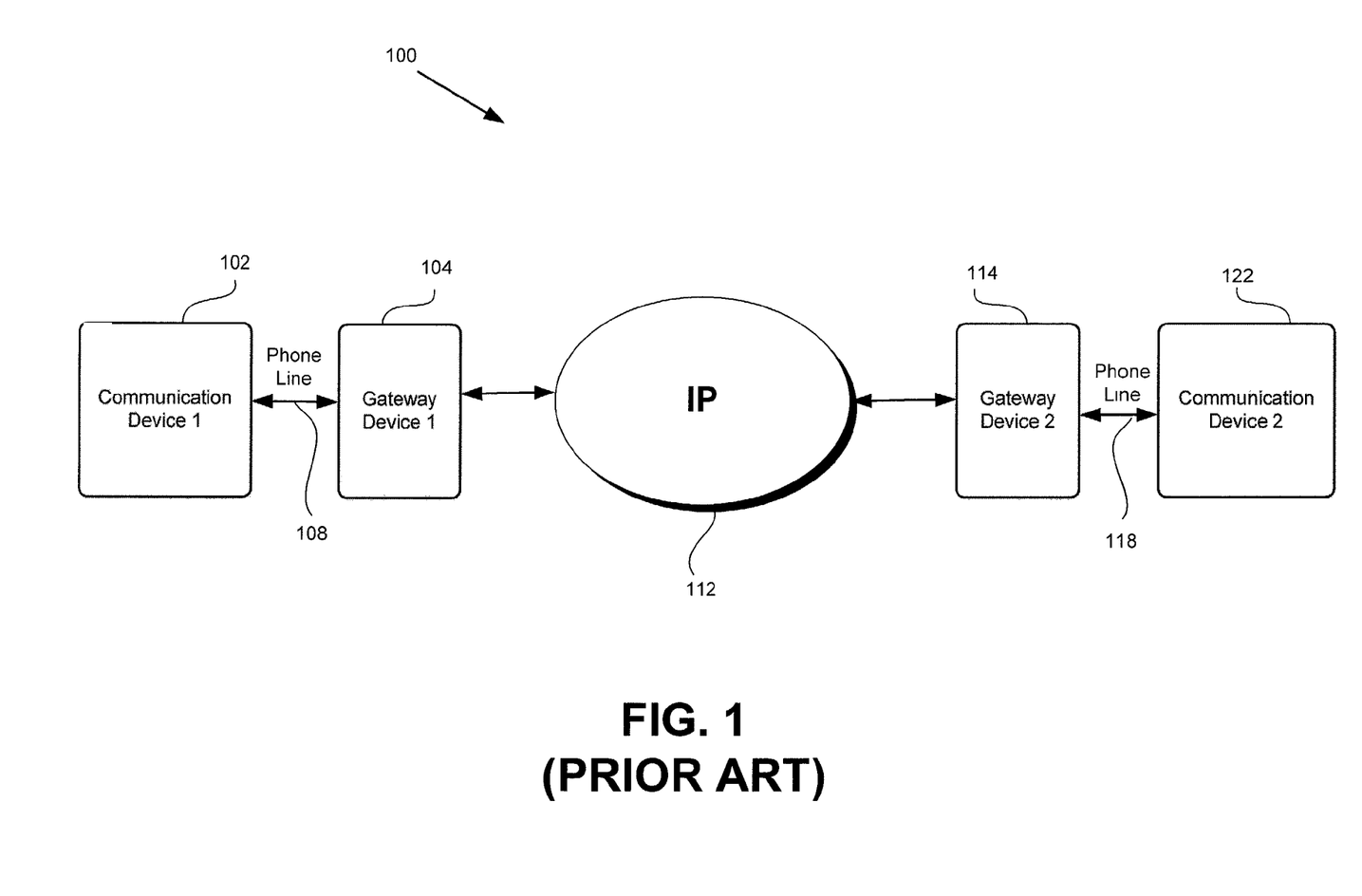
FIG. 1 illustrates a block diagram of a conventional communications network utilizing modems for communication over a packet network protocol.

FIG. 1 illustrates a block diagram of a conventional communications network 100 utilizing modems for communication over a packet network protocol, such as Internet Protocol, which may also be referred to as Modem over Internet Protocol ("MoIP"). As shown, communications network 100 includes first communication device 102 in communication with first gateway device 104 and second gateway device 114 in communication with second communication device 122. Communications network 100 further includes a packet network protocol, such as IP 112 to provide communications between first gateway device 104 and second gateway device 114. IP 112 implements the network layer (layer 3) of a network protocol, which contains a network address and is used to route a message to a different network or subnetwork. IP 112 accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. UDP is widely used for real-time voice and video transmissions where erroneous packets are not retransmitted.

Devices 102, 104, 114 and 122 may include modems (modulator-demodulator). Modems may support a variety of data modulation standards, such as ITU (International Telecommunications Union) standards: V.22bis, V.34, V.90 or V.92, etc. Devices 102, 104, 114 and 122 may also include cable or DSL modems, which are all digital and technically not modems, but referred to as modems in the industry. Typically, modems have built-in error correction, such as MNP2-4 or LAPM (or V.42) and data compression, such as MNP5, V.42bis or V.44. Modems are also capable of supporting various voice and facsimile standards.

The communication process begins when first communication device 102, e.g. first modem ("M1"), originates a call to establish communications with second communication device 122, e.g. second modem ("M2"). First gateway device 104 ("G1") receives the call and informs second gateway device 114 ("G2") of the call for M2 over communications network 100 and, as a result, G2 calls M2.

Typically, in the default mode of operation, G1 and G2 communicate in voice mode and use compressed voice protocol, such as the ITU standard G.723. After M2 receives the call from G2, M2 answers the call and starts sending an answer tone, which is typically transmitted at about 2100 Hz frequency. At this point, G2 starts confirming the answer tone for a pre-defined period of time, e.g. 300 ms to 1000 ms. Once G2 confirms the answer tone, G2 informs G1 that the present communication session is a modem or facsimile session.

However, once G2 detects the answer tone, e.g., 2100 Hz tone, from M2, then G2 and G1 switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the signals generated by M2 may propagate through from G2 to G1 in a more intact manner in order to reach the first modem at the other side. Alternatively, once G2 detects the answer tone from M2, then G1 and G2 may switch into other modes designed to accommodate modem or facsimile devices.

However, there are many drawbacks in the above-described method and system of connecting communication devices, such as modems and facsimile devices over IP. As described above, G2 must confirm presence of answer tone for a sufficient period of time prior to switching out of compressed voice mode, e.g. G.729 or G.723 to uncompressed voice mode, such as G.711, or to modem or facsimile mode, since a false detection of answer tone and thus, a false switch by G1 and G2 to modem or facsimile mode would cause an undesirable interruption in voice communications. For example, noise or a female voice may be misinterpreted as a modem answer tone if answer tone is not properly confirmed and voice communication would be interrupted by switching G1 and G2 to modem or facsimile mode.

One specific problem occurs when M1 receives M2's answer tone while G2 is confirming M2's answer tone to determine whether to switch to modem or facsimile mode. It should be noted that while G2 is confirming M2's answer tone, G2 and G1 are in voice mode communication, and therefore, M1 can receive M2's answer tone while G2 is confirming the presence of an answer tone. The problem occurs when M1 starts acting on M2's answer tone, for example, M1 detects and confirms the answer tone and starts responding to M2's answer tone prior to G2 and G1 switching to modem or facsimile mode. Further, M1 and M2 may go into a handshaking process, which may be difficult to stop and re-start once it begins.

One possible solution may be for G2 to block any incoming signal coming from M2 122 for a pre-determined amount of time, e.g. five to ten seconds, after G2 114 places a call to M2 122. Modem answer tones, in general, last about three to four seconds and are generated by M2 122 upon answering the call. If the answer tone is blocked, then M1 102 will continue to wait until G1 and G2 switch over to properly handle a modem communication.

However, such solution may be unsuitable for voice calls over IP. It should be noted, as explained above, the communications network 100 defaults to voice mode and has no knowledge that at second communication device 122 is a modem or a facsimile device. As such, communications network 100 cannot readily block the modem signals of communication device 122 exclusively. Thus, communications network 100 would need to block the first 5 or 10 seconds in all cases, voice, modem, or facsimile. Since such method blocks all signals for the first 5 or 10 seconds, it would also have to block voice signals. Blocking voice signals may be unacceptable for users.

Accordingly, there is an intense need in the art for communication networks utilizing a packet network protocol that are able to efficiently, reliably and timely detect and support modem communications, such as data and facsimile modems.

SUMMARY OF THE INVENTION

In accordance with the purpose of the present invention as broadly described herein, there is provided system and method for communication over a network. In one aspect of the present invention, the network includes a first gateway device and a second gateway device capable of communicating with each other using a packet protocol. Further, the second gateway device is capable of communicating with a communication device, such as a modem device or a facsimile device, over a standard telecommunication line, such as a PSTN line, a dedicated leased line or the like (hereinafter "telephone line").

In one aspect, a method of the present invention comprises receiving a call request by the second gateway device from the first gateway device for the communication device. In response to receiving such call request, the second gateway device places a call to the communication device over the telephone line. The method further includes enabling a tone detector for detecting a tone, such as an answer tone generated by the modem or facsimile device. Next, the second gateway device detects the answer tone received from the communication device over the telephone line and enables a filter, in response thereto, to prevent the answer tone from reaching the first gateway device.

In a further aspect of the present invention, the answer tone detector is enabled for a pre-determined period of time, such as five to seconds. In yet another aspect, the filter is a notch filter centered around 2100 Hz. Even yet, in one aspect, the filter is enabled by the tone detector for a pre-determined period of time.

In yet another aspect of the present invention, a tone detector is not utilized and a notch filter is enabled for a pre-determined period of time, such as five to ten seconds, after the second gateway places a call to the communication device.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communications networks and is not limited to modem over IP.

Figure 2:
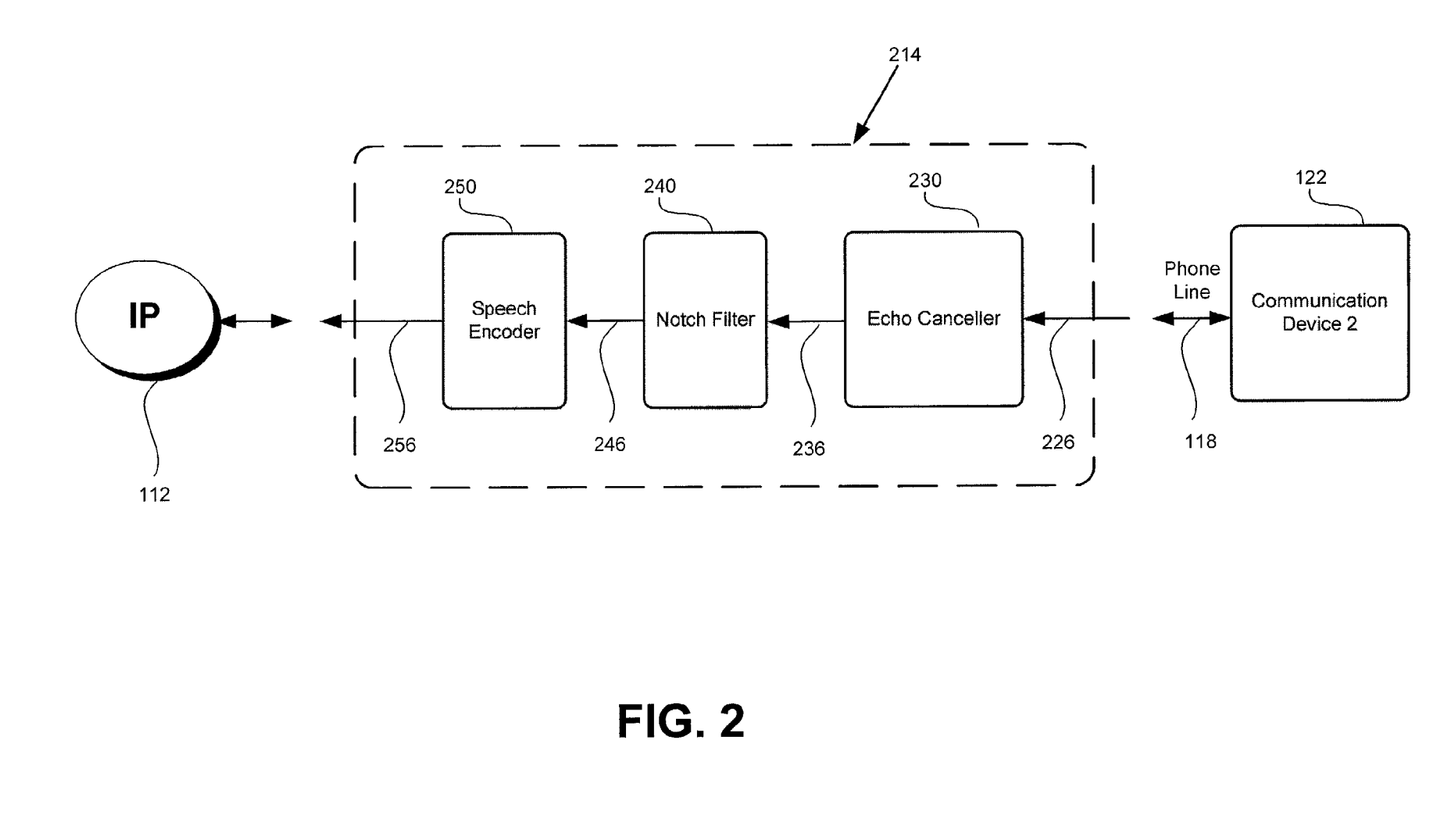
FIG. 2 illustrates a block diagram of a gateway device according to one embodiment of the present invention.

FIG. 2 illustrates an example system of the present invention comprising notch filter 240 for filtering the answer tone transmitted by second communication device 122. According to one embodiment of the present invention, a filter, such as a narrow band pass or a notch filter, is used to filter out the answer tone, such as the 2100 Hz answer tone, at second gateway device 114. As shown in FIG. 2, block 214 corresponds to elements that may be included in second gateway device 114 of FIG. 1. Although only a portion of the elements of second gateway device 114 is shown, for brevity, block 214 will be referred to as gateway device 214. As shown, echo canceller 230 receives signal 226 as input from telephone line 118. Echo canceller 230 is used for canceling any echoes that may arise from telephone line 118. Echo canceller 230 improves detection performance by mitigating echo and is well known in the art. Echo canceller output 236 is filtered by notch filter 240 that is centered at 2100 Hz. Notch filter output 246 is coupled to input of speech encoder 250. Speech encoder output 256 is then sent across IP 112.

In one embodiment, notch filter 240, generally, is a narrow band rejection filter centered at the answer tone frequency. Generally, the majority of modem answer tones are around 2100 Hz frequency. However, there are some modems that have answer tones that use a different frequency, such as Bell standard compatible modems. It will be appreciated by those skilled in the art that one or more notch filters may be used to block one or more frequencies. When notch filter 240 is placed in the signal path, it prevents all or substantially all of the answer tone from reaching first gateway device 104 and first communication device 102. It should be appreciated that various designs of notch filters are known in the art.

In another embodiment (not shown), notch filter 240 may precede echo canceller 230 in FIG. 2, such that notch filter 240 receives telephone line signal 226 before it reaches echo canceller 230 and an output of notch filter 240 is then fed into echo canceller 230 coupled to speech encoder 250. Furthermore, in yet another embodiment similar to that of FIG. 2, second gateway device 214 does not include echo canceller 230 and, therefore, notch filter 240 receives telephone line signal 226 and an output of notch filter 240 is then fed into speech encoder 250.

In other embodiments of the present invention, however, it may be desirable not to leave notch filter 240 enabled continuously, since notch filter 240 may potentially interfere with linear predictive coding used by speech encoder 250, for example, if speech encoder 250 is configured for G.729 speech coding. In such event, in one embodiment, notch filter 240 may be enabled for a pre-determined amount of time, e.g. five to ten seconds, after G2 114 places a call to M2 122. As stated above, modem answer tones, in general, last about three to four seconds and are generated by M2 122 upon answering the call. If the answer tone is substantially blocked by notch filter 214, then M1 102 will continue to wait until G1 and G2 switch over, in order to properly handle a modem or facsimile communication.

Figure 3:
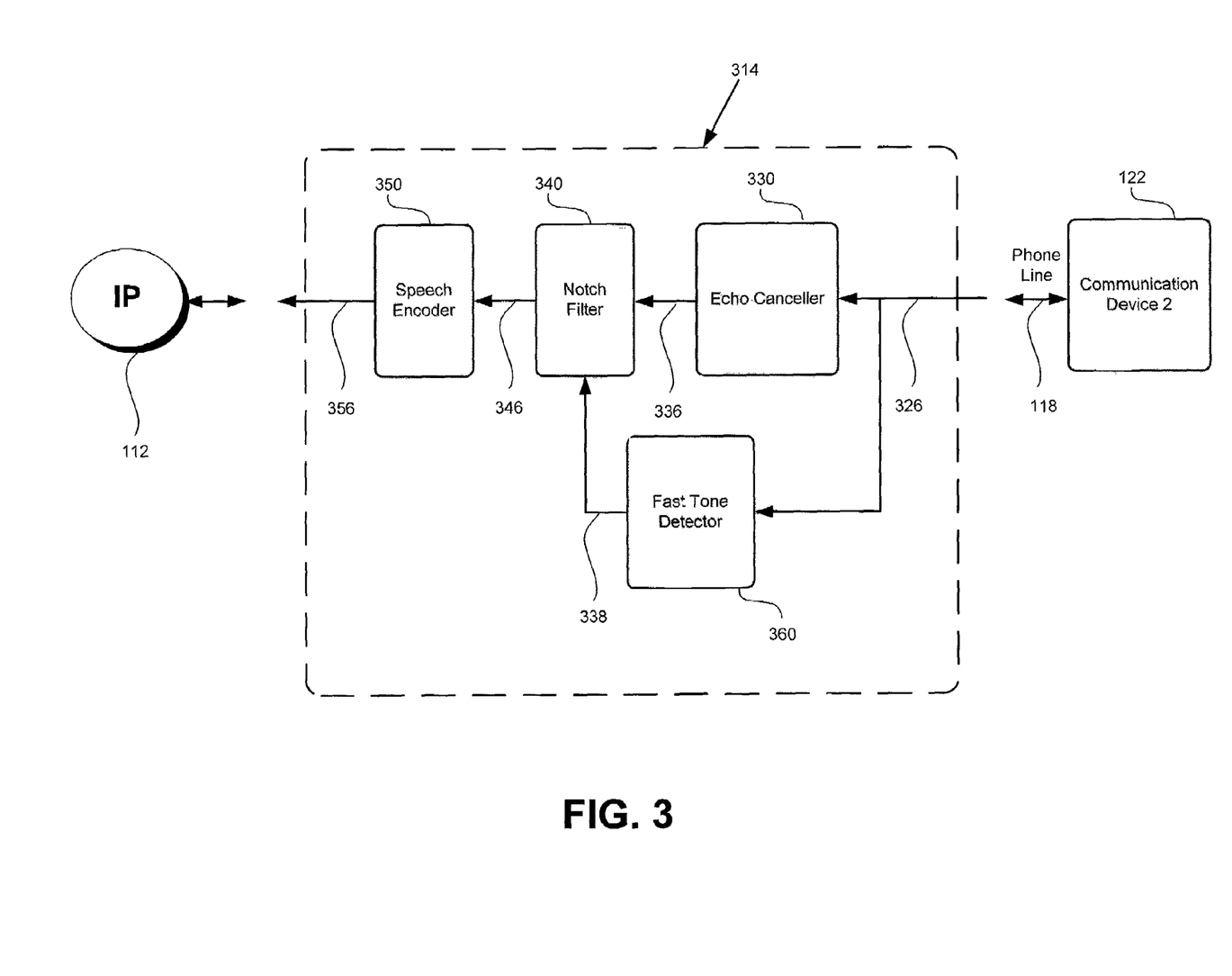
FIG. 3 illustrates a block diagram of a gateway device according to one embodiment of the present invention.

Yet, in some embodiments, a fast tone detector may be utilized to timely enable or disable notch filter 240. As shown in FIG. 3, block 314 corresponds to elements that may be found in second gateway device 114 of FIG. 1. Although only a portion of the elements of second gateway device 114 is shown, for brevity, block 314 will be referred to as gateway device 314 herein. As shown, echo canceller 330 receives telephone line signal 326 as input from telephone line 118. Echo canceller output 336 is filtered by notch filter 340 that, in one embodiment, is centered at 2100 Hz if notch filter 340 is enabled by fast tone detector 360. Notch filter output 346 is further coupled to an input of speech encoder 350. Speech encoder output 356 is then sent across IP 112.

As shown in FIG. 3, telephone line signal 326 is also provided as input to fast tone detector 360. In another embodiment, fast tone detector 360 may receive input signal 336 from echo canceller 330 instead of receiving telephone line signal 326. If fast tone detector 360 detects that input signal 326 or 336 is a 2100 Hz tone, then fast tone detector 360 enables notch filter 340 by way of notch filter control signal 338, otherwise notch filter 340 is disabled by way of notch filter control signal 338.

Fast tone detector 360 allows notching only when it detects presence of 2100 Hz tone for a pre-determined amount of time. Using fast tone detector 360 reduces the chance of notch filter 340 interfering with LPC analysis of speech encoders such as G.729. Fast tone detector 360 should detect the answer tone sufficiently fast so that notch filter 340 is enabled timely to prevent M1 from receiving enough answer tone that can be confirmed as a valid duration for answer tone by M1. In one embodiment, fast tone detector 360 enables notch filter 340 if fast tone detector 360 detects about 10–20 milliseconds of answer tone. As noted above, typically, modems confirm presence of an answer tone for several hundreds milliseconds prior to considering such answer tone as valid. Those of ordinary skills in the art are familiar with a variety of fast tone detectors and implementation of such detectors.

In one embodiment, fast tone detector 360 may be able to enable notch filter 340 only during a pre-determined amount of time, e.g. five to ten seconds, after G2 114 places a call to M2 122. Further as described in conjunction with FIG. 2, second gateway device 114 may or may not include an echo canceller. In such event, fast tone detector 360 and notch filter 340 would receive telephone line signal 326.

Figure 4:
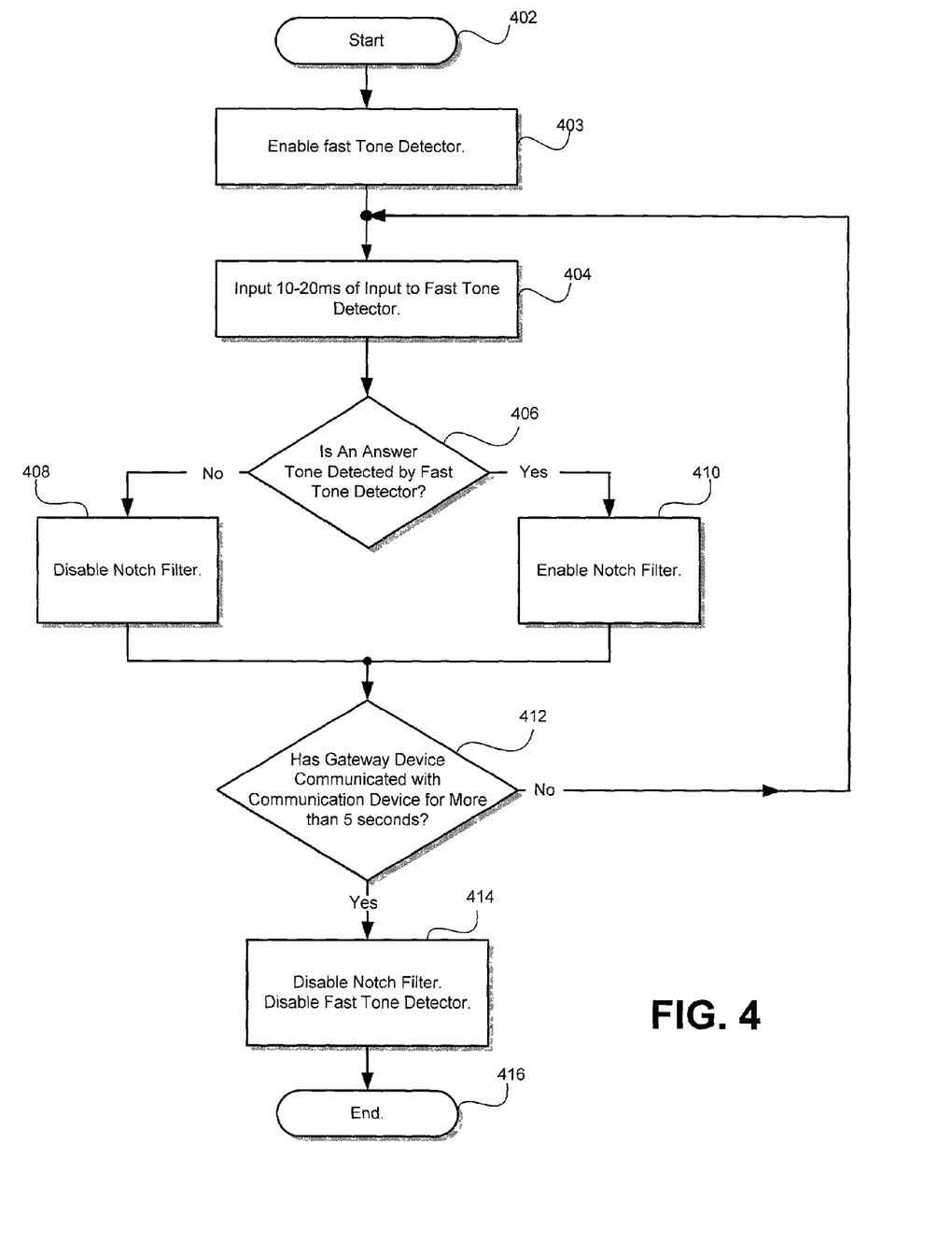
FIG. 4 illustrates a flow diagram of an exemplary method of using the gateway device of FIG. 3.

FIG. 4 illustrates an exemplary method in accordance to one embodiment of the present invention as shown in second gateway device 314 of FIG. 3. As shown, flow diagram of FIG. 4 begins at step 402 after second gateway device 314 places a call to second communication device 112. Next, in step 403, fast tone detector 360 is configured for fast detection of answer tone. In step 404, fast tone detector 360 debounces telephone line signal 326 for 10–20 ms to determine presence of 10–20 ms of answer tone in telephone line signal 326. An analysis window of 10–20 ms of telephone line signal 326 provides a sufficient window of samples for fast tone detector 360 to detect a tone. This window size can be shorter or longer so long as the fast tone detector 360 reacts timely enough to enable notch filter 340, since if the analysis window is too long in duration, then it is possible that the tone detection delay will be too long such that an undesirable amount of 2100 Hz answer tone burst is transmitted to first communication device 102; on the other hand, if the analysis window is too short in duration, then notch filter can be enabled too quickly, which may cause undesirable interference with speech signals.

Next, second gateway device 314 proceeds to step 406, where it is determined whether 10–20 ms of answer tone has been detected by fast tone detector 360. In step 406, if fast tone detector 360 detects an answer tone, then gateway device 314 proceeds to step 410. Otherwise, gateway device 314 proceeds to step 408. In step 408, since an answer tone was not detected, gateway device 314 disables notch filter 340 or notch filter 340 remains disabled and second gateway device 314 then proceeds to step 412.

On the other hand, in step 410, since an answer tone was detected, gateway device 314 enables notch filter 340 to prevent answer tone from being transmitted over IP 112 and second gateway device 314 then proceeds to step 412.

In step 412, according to one embodiment of the present invention, second gateway device 314 makes a determination as to whether it has been in communication with second communication device 122 for longer than a pre-determined amount of time, e.g. five seconds. If said determination is true, then gateway device 314 proceeds to step 414, where the process is ended. Otherwise, gateway device 314 proceeds to step 404 to continue detecting presence of answer tone. It should be noted that in some embodiments, step 412 does not exist; therefore, second gateway device 314 may proceed to step 404 after step 408 or 410.

In step 414, since gateway device 314 previously determined that it has communicated with second communication device 122 for more than five seconds, then gateway device 314 disables notch filter 340 and fast tone detector 360. Notch filter 340 is no longer needed because gateway device 314 assumes that an answer tone from the second communication device 122 will not appear after a pre-determined amount of time. Gateway device 314 then proceeds to step 416. In step 416, the procedure of gateway device 314 for operating tone detection and notch filter ends.

Those skilled in the art will appreciate that the five-second duration used in step 412 is only one example. The duration may be shorter, longer or perpetual depending upon desired performance requirements of communications network 100. Also, the 10–20 ms of analysis window for fast tone detector 360 is merely an example. Again, those skilled in the art will appreciate that the window duration can vary depending on the performance requirements of communications network 100.

Figure 5:
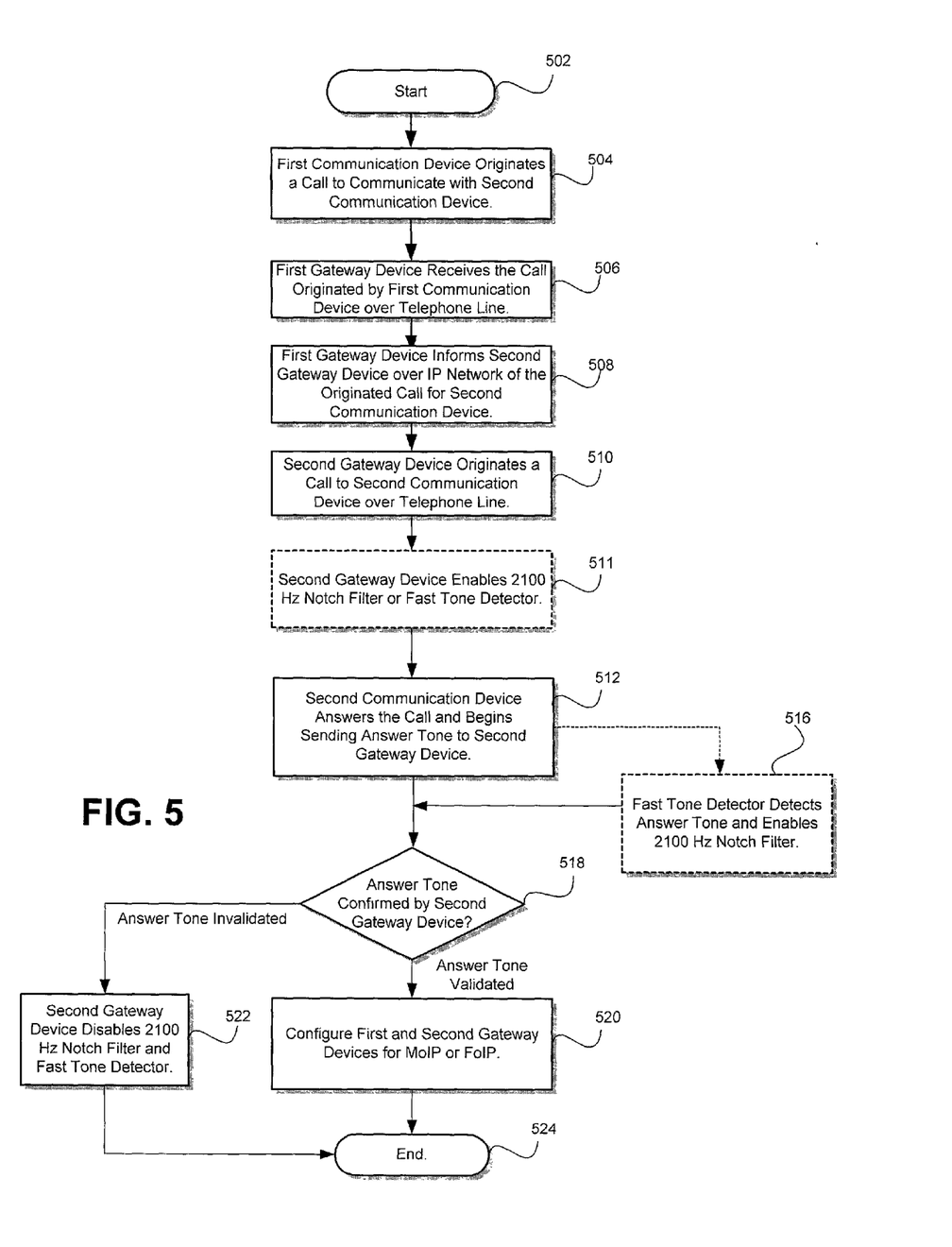
FIG. 5 illustrates a flow diagram of an exemplary method of communication over IP network of FIG. 1.

FIG. 5 illustrates a flow diagram of an exemplary method of communication over communications network 100. Flow diagram begins at step 502 and proceeds to step 504 when first communication device 102 originates a call to communicate with second communication device 122. In step 506, first gateway device 104 receives the call from first communication device 102 over telephone line 108. In step 508, first gateway device 104 informs second gateway device 114 of the originated call for second communication device 122, over IP network. In step 510, second gateway device 114 originates a call to second communication device 122 over telephone line 118. In one embodiment, in step 511, second gateway device 114 enables 2100 Hz notch filter 214 or 314, or instead, in another embodiment, second gateway device 114 enables 2100 Hz fast tone detector 360. In some embodiments, notch filter 214 or 314, or instead, fast tone detector 360 may be enabled for a pre-determined amount of time, e.g. five to ten seconds, at step 511. In step 512, second communication device 122 answers the call originated by second communication device 122 and starts transmitting an answer tone.

At this point, if notch filter 214 or 314 was enabled at step 511, the answer tone is blocked by notch filter 214 or 314 and will not be transmitted to first gateway device 104 over IP 112 and flow diagram moves to step 520. Else, if fast tone detector 360 was enabled at step 511, flow diagram moves to step 516, wherein fast tone detector 360 detects the answer tone and enables notch filter 314 to prevent the answer tone from being transmitted to first gateway device 104 over IP 112 and flow diagram moves to step 520.

In some embodiments, in step 318, second gateway device 114 determines whether the answer tone is a valid answer tone. If the answer tone is confirmed or validated by second gateway device 114, flow diagram moves to step 520, wherein first gateway device 104 and second gateway device 114 may be configured to handle MoIP or Facsimile over IP ("FoIP"). Next, flow diagram moves to step 530 and flow diagram ends after MoIP or FoIP communications is established over communications network 100. Alternatively, if presence of answer tone is invalidated by second gateway device 114, flow diagram moves to step 522, wherein second gateway device 114 disables notch filter 214 or 314 and/or fast tone detector 360, and the flow diagram ends at step 524 without configuring gateway devices 104 and 114 for MoIP or FoIP.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of communicating over a network, said network having a first gateway device and a second gateway device capable of communicating with each other using a packet protocol, said second gateway device capable of communicating with a communication device over a telephone line, said method comprising the steps of:

receiving a call request by said second gateway device from said first gateway device for said communication device;

placing a call by said second gateway device to said communication device over said telephone line;

enabling a tone detector for detecting a tone from said communication device;

detecting said tone from said communication device over said telephone line; and enabling a filter, in response to said detecting step, to prevent said tone from reaching said first gateway device.

2. The method of claim 1, wherein said communication device is a modem device.

3. The method of claim 1, wherein said communication device is a facsimile device.

4. The method of claim 1, wherein said tone is an answer tone.

5. The method of claim 1, wherein said step of enabling said tone detector enables said tone detector for a pre-determined period of time.

6. The method of claim 1, wherein said tone detector is a fast tone detector.

7. The method of claim 1, wherein said filter is a notch filter centered around 2100 Hz.

8. The method of claim 1, wherein said step of enabling said filter enables said tone detector for a pre-determined period of time.

9. The method of claim 1 further comprising the step of informing said first gateway device of said communication device, in response to said detecting step.

10. A method of communicating over a network, said network having a first gateway device and a second gateway device capable of communicating with each other using a packet protocol, said second gateway device capable of communicating with a communication device over a telephone line, said method comprising the steps of:

receiving a call request by said second gateway device from said first gateway device for said communication device;

placing a call by said second gateway device to said communication device over said telephone line;

enabling an answer tone detector;

receiving an answer tone from said communication device;

detecting said answer tone using said answer tone detector; and preventing said answer tone from reaching said first gateway device.

11. The method of claim 10, wherein said communication device is a modem device.

12. The method of claim 10, wherein said communication device is a facsimile device.

13. A method of communicating over a network, said network having a first gateway device and a second gateway device capable of communicating with each other using a packet protocol, said second gateway device capable of communicating with a communication device over a telephone line, said method comprising the steps of:

receiving a call request by said second gateway device from said first gateway device for said communication device;

placing a call by said second gateway device to said communication device over said telephone line;

enabling a filter;

receiving an answer tone from said communication device; and preventing said answer tone from reaching said first gateway device;

wherein said step of preventing uses said filter to prevent said answer tone from reaching said first gateway device.

14. The method of claim 13, wherein said step of enabling said filter enables said filter for a pre-determined period of time.

15. The method of claim 13, wherein said filter is a notch filter centered around 2100 Hz.

16. The method of claim 10, wherein said answer tone detector is a fast tone detector.

17. The method of claim 16, wherein said step of enabling said filter enables said filter for a pre-determined period of time.

18. The method of claim 16, wherein said filter is a notch filter centered around 2100 Hz.

19. The method of claim 16, wherein said step of enabling said fast tone detector enables said fast tone detector for a pre-determined period of time.

20. A filter for use in conjunction with a first gateway device capable of communicating with a second gateway device using a packet protocol, said first gateway further capable of communicating with a communication device over a telephone line, said filter comprising:

an input configured to receive a first signal from said communication device;

a filter circuit configured to filter an answer tone from said first signal to generate a second signal;

an output to provide said second signal for transmission to said second gateway;

wherein said first signal is received from an echo canceller receiving a third signal over said telephone line from said communication device.

21. A filter for use in conjunction with a first gateway device capable of communicating with a second gateway device using a packet protocol, said first gateway further capable of communicating with a communication device over a telephone line, said filter comprising:

an input configured to receive a first signal from said communication device;

a filter circuit configured to filter an answer tone from said first signal to generate a second signal;

an output to provide said second signal for transmission to said second gateway; and a filter enable circuit, wherein said filter enable circuit enables said filter circuit for a pre-determined period of time.

22. A filter for use in conjunction with a first gateway device capable of communicating with a second gateway device using a packet protocol, said first gateway further capable of communicating with a communication device over a telephone line, said filter comprising:

an input configured to receive a first signal from said communication device;

a filter circuit configured to filter an answer tone from said first signal to generate a second signal;

an output to provide said second signal for transmission to said second gateway; and a filter enable circuit coupled to a tone detector circuit, wherein said tone detector circuit receives said first signal from said communication device and enables said filter circuit via said filter enable circuit if said tone detector detects said answer tone.

23. The filter of claim 22, wherein said tone detector is enabled for a pre-determined period of time.

24. The filter of claim 22, wherein said first signal is received from an echo canceller receiving a third signal over said telephone line from said communication device.

25. The filter of claim 20, wherein said communication device is a modem device.

26. The filter of claim 20, wherein said communication device is a facsimile device.

27. The filter of claim 20, wherein said filter circuit is a notch filter circuit centered around 2100 Hz.

28. A computer program product for use in communication over a network, said network having a first gateway device and a second gateway device capable of communicating with each other using a packet protocol, said second gateway device capable of communicating with a communication device over a telephone line, said computer program product comprising:

code for receiving a call request by said second gateway device from said first gateway device for said communication device;

code for placing a call by said second gateway device to said communication device over said telephone line;

code for enabling an answer tone detector;

code for receiving an answer tone from said communication device;

code for detecting said answer tone using said answer tone detector; and code for preventing said answer tone from reaching said first gateway device.

29. The computer program product of claim 28, wherein said communication device is a modem device.

30. The computer program product of claim 28, wherein said communication device is a facsimile device.

31. A computer program product for use in communication over a network, said network having a first gateway device and a second gateway device capable of communicating with each other using a packet protocol, said second gateway device capable of communicating with a communication device over a telephone line, said computer program product comprising:

code for receiving a call request by said second gateway device from said first gateway device for said communication device;

code for placing a call by said second gateway device to said communication device over said telephone line;

code for enabling a filter;

code for receiving an answer tone from said communication device; and code for preventing said answer tone from reaching said first gateway device;

wherein said code for preventing uses said filter to prevent said answer tone from reach said first gateway device.

32. The computer program product of claim 31, wherein said code for enabling said filter enables said filter for a pre-determined period of time.

33. The computer program product of claim 31, wherein said filter is a notch filter centered around 2100 Hz.

34. The computer program product of claim 28, wherein said answer tone detector a is fast tone detector.

35. The computer program product of claim 34, wherein said code for enabling said filter enables said filter for a pre-determined period of time.

36. The computer program product of claim 34, wherein said filter is a notch filter centered around 2100 Hz.

37. The computer program product of claim 34, wherein said code for enabling said fast tone detector enables said fast tone detector for a predetermined period of time.

38. A first gateway device capable of communicating with a second gateway device over a packet network, said first gateway device further capable of communicating with a communication device over a communication line, said first gateway device comprising:
   a receiver configured to receive a call request over said packet network from said second gateway device for said communication device;
   a call module configured to place a call to said communication device over said communication line;
   a filter configured to prevent a tone from reaching said second gateway device over said packet network, wherein said tone is generated by said communication device in response to said call; and
   a tone detector configured to detect said tone, wherein said tone detector enables said filter upon detection of said tone.

39. The first gateway device of claim 38, wherein said tone is an answer tone.

40. The first gateway device of claim 38, wherein said communication device is a modem device.

41. The first gateway device of claim 38, wherein said communication device is a facsimile device.

42. A first gateway device capable of communicating with a second gateway device over a packet network, said first gateway device further capable of communicating with a communication device over a communication line, said first gateway device comprising:
   a receiver configured to receive a call request over said packet network from said second gateway device for said communication device;
   a call module configured to place a call to said communication device over said communication line; and
   a filter configured to prevent a tone from reaching said second gateway device over said packet network, wherein said tone is generated by said communication device in response to said call;
   wherein said filter is enabled for a pre-determined period of time after said call module places said call.

43. The first gateway device of claim 38, wherein said filter is a notch filter centered around 2100 Hz.

44. The first gateway device of claim 38, wherein said tone detector is enabled for a pre-determined period of time after said call module places said call.

* * * * *